(12) United States Patent
Kondo

(10) Patent No.: US 6,473,497 B1
(45) Date of Patent: Oct. 29, 2002

(54) DIGITAL TELEPHONE SET

(75) Inventor: Makoto Kondo, Tokyo (JP)

(73) Assignee: NEC Infrontia Corporation, Kawasaki (JP)

( * ) Notice: Subject to any disclaimer, the term of this patent is extended or adjusted under 35 U.S.C. 154(b) by 0 days.

(21) Appl. No.: 09/208,414

(22) Filed: Dec. 10, 1998

(30) Foreign Application Priority Data

Dec. 11, 1997 (JP) ................................. 9-341448

(51) Int. Cl.⁷ .......................... H04M 11/00; H04R 5/00; H04H 5/00; H04B 3/00
(52) U.S. Cl. ................... 379/93.06; 379/93.09; 379/93.17; 379/93.23; 379/93.29; 381/1; 381/2; 381/77
(58) Field of Search .................. 379/67.1, 88.27, 379/165, 387.02, 422, 93.06; 381/1, 2, 77

(56) References Cited

U.S. PATENT DOCUMENTS 5,195,087 A * 3/1993 Bennett et al.
5,223,825 A * 6/1993 Ikezaki
5,485,514 A * 1/1996 Knappe et al.
5,828,730 A * 10/1998 Zebryk et al.
5,889,767 A * 3/1999 Kimura
6,138,139 A * 10/2000 Beck et al.
6,181,736 B1 * 1/2001 McLaughlin et al.

FOREIGN PATENT DOCUMENTS

| JP | 2-21957 | 2/1990 |
| JP | 5-252315 | 9/1993 |
| JP | 7-111547 | 4/1995 |

* cited by examiner

Primary Examiner—Fan Tsang
Assistant Examiner—Gerald Gauthier
(74) Attorney, Agent, or Firm—Sughrue Mion, PLLC

(57) ABSTRACT

An aural information is expanded correspondingly to a compression system and a compression rate when a receiving signal from a digital telephone circuit is the aural information and a control signal received from the digital telephone circuit indicates that the aural information is compressed. When the control information indicates a stereo system including a right voice system and a left voice system, right and left voices are separated and output. Thus, a stereo communication is realized with an improved tone quality with using a digital telephone set.

8 Claims, 4 Drawing Sheets

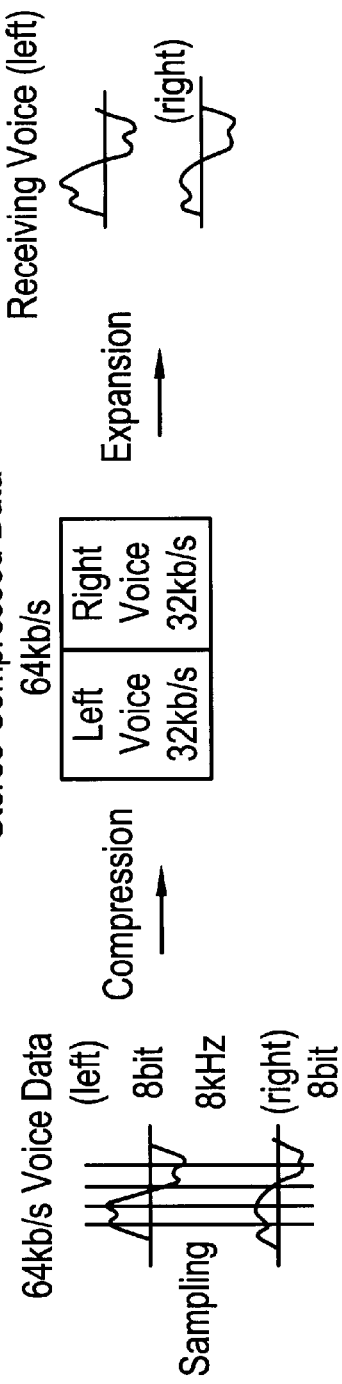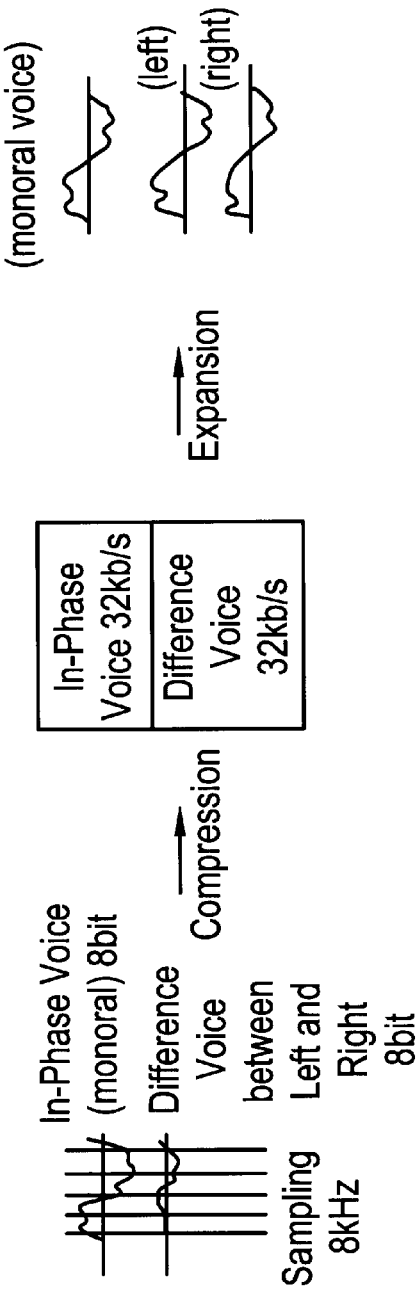

DIGITAL TELEPHONE SET

CROSS REFERENCE TO RELATED APPLICATIONS

The present invention claims priority from Japanese Patent Application No. 9-341448 filed Dec. 11, 1997, the contents of which are incorporated herein by reference.

BACKGROUND OF THE INVENTION

1. Field of the Invention

The present invention relates to an aural communication system for a digital telephone set and, particularly, to a digital telephone set using a high tone quality aural communication system capable of performing a stereo aural communication.

2. Description of Related Art

First, a conventional digital telephone set will be described.

An example of the digital telephone set is disclosed in Japanese Patent Application Laid-open No. Hei 7-111547. In the disclosed digital telephone set, a transmission charge is reduced by transmitting an externally input data as well as an aural signal through a B channel. In order to realize the simultaneous transmission of the externally input data and the aural signal, the aural signal from the digital telephone set is compressed by converting it into a PCM code and further into an adaptive differential PCM (ADPCM) code and the externally input data is converted into a 8-bit serial data. The ADPCM code and the 8-bit serial data are multiplexed in a unit frame of 8 bits and transmitted to an integrated services digital network (ISDN). An 8-bit unit frame received from the ISDN is processed in a reverse manner to the above.

Further, Japanese Patent Application Laid-open No. Hei 5-252315 discloses an example of a conventional digital telephone system. In the digital telephone system disclosed in Japanese Patent Application Laid open No. Hei 5-252315, a standard telephone set is used to input/output an aural signal with respect to a computer system. When a telephone aural mode is selected in the computer system, an aural signal from a private circuit to which the standard telephone set is connected to obtain a set of aural signal samples. The aural signal samples are converted into an aural data stream having a standard data format and the aural data stream is transferred to a telephone driver operating in a digital signal processing sub system. The telephone driver converts the aural data stream into a telephone data value and transfers the latter to a telephone circuit. The telephone circuit generates a telephone voice signal corresponding to the telephone data value and the telephone voice signal is transferred to the standard telephone set through the private circuit.

These conventional arts have a problem that a tone quality of the telephone set is insufficient. Further, these are also insufficient in transmitting voice together with ambience to another.

The reasons for these are that the telephone set has been prepared for the purpose of monaural voice conversation and requires a tone quality which is not higher than the tone quality with which such monaural conversation is possible and that the telephone set has substantially no measure against a high tone quality voice communication and a stereo voice communication. The above facts are still maintained in the present situation in which the digitalization of communication circuit is being promoted and these functions are not obtained in the digital telephone set.

In the digital telephone set disclosed in the previously mentioned Japanese Patent Application Laid-open No. Hei 5-252315, the audio signal compression technique is utilized to maintain an amount of information for the data transmission.

In the computer system disclosed in the previously mentioned Japanese Patent Application Laid-open No. Hei 7-111547, the tone quality is not improved although aural signal is treated in the telephone voice mode.

SUMMARY OF THE INVENTION

An object of the present invention is to realize a stereo aural communication by improving the tone quality of aural communication through a digital telephone set.

According to a first aspect of the present invention, a digital telephone set is provided, which is featured by comprising a digital signal transmitter/receiver for transmitting/receiving a digital signal with respect to a digital telephone circuit, a protocol control portion for transmitting/receiving various control signals through the digital signal transmitter/receiver and the digital telephone circuit and converting an information contained in the digital signal received by the digital signal transmitter/receiver into a series of information by determining the kind of the information contained in the digital signal received by the digital signal transmitter/receiver correspondingly to a protocol of the digital signal, a receiving system recognizing portion for recognizing a communication system of an aural signal information when a receiving signal information obtained by a conversion performed in the protocol control. portion is the aural signal information, receiving aural signal processing means for processing the aural signal information according to the communication system recognized by the receiving system recognizing portion and aural signal output means for converting the aural signal information processed by the receiving aural signal processing means into an analog aural signal information and supplying the analog aural signal as a sound signal. The receiving aural signal processing means includes a compressed aural signal information expanding portion for expanding the aural information correspondingly to a compression system and a compression rate used in compressing the aural signal information when it is indicated by the communication system obtained by the receiving system recognizing portion that the aural signal information is compressed and a stereo separation portion for separating the aural signal information when the communication system obtained by the receiving system recognizing portion indicates that the aural signal information is a stereo format having a right aural signal and a left aural signal. The aural signal output means includes means for supplying the stereo aural signal information as the right voice and the left voice.

The construction of the digital telephone set mentioned above is intended to receive an aural signal information from a remote side. However, it is preferable for the digital telephone set to additionally have a construction for transmitting an aural signal information to a remote side. That is, the digital telephone set preferably further comprises aural signal input means for converting an analog. aural signal information into a digital aural signal information with directivity corresponding to a right ear and a left ear, a communication system setting portion for preliminarily setting the communication system to transmit the aural signal information input from the aural signal input means to the digital telephone circuit to a compression system and the stereo system, transmitting aural signal information processing means for processing the aural signal information from the aural signal input means according to the thus set compression system and the stereo system and a communication system notifying portion for incorporating the communication system information indicative of the compression system and the stereo system of the aural signal information output from the transmitting aural signal information processing means in the protocol control information. The protocol control portion preferably transmits the protocol information including the communication system information incorporated therein by the communication system notifying portion to a remote side through the digital signal transmitter/receiver and the digital telephone circuit and transmits the aural signal information output from the transmitting aural signal information processing means after a format of the aural signal information is converted into a format compatible with the protocol of the digital telephone circuit.

The present invention can be embodied with only the construction for the aural signal transmission. That is, according to a second aspect of the present invention, the digital telephone set comprises aural signal input means for converting the aural signal information into a digital aural signal information with directivity corresponding to a right ear and a left ear, a communication system setting portion for preliminarily setting the communication system for transmitting the aural signal information input from the aural signal input means to the digital telephone circuit to a compression system and the stereo system, transmitting aural signal information processing means for processing the aural signal information from the aural signal input means according to the thus set compression system and the stereo system, a communication system notifying portion for incorporating the communication system information indicative of the compression system and the stereo system of the aural signal information output from the transmitting aural signal information processing means in the protocol control information, a protocol control portion for converting the aural signal information processed by the transmitting aural signal information processing means such that the aural signal information becomes compatible to the protocol of the digital telephone circuit and transmitting/receiving various control information including the protocol information and a digital signal transmitter/receiver for transmitting the aural signal information converted by the protocol control portion to the digital telephone circuit and transmitting/receiving the various control information between the protocol control portion and the digital telephone circuit.

BRIEF DESCRIPTION OF THE DRAWINGS

The above mentioned and other objects, features and advantages of the present invention will become more apparent by reference to the following detailed description of the invention taken in conjunction with the accompanying drawings, in which:

FIG. 4A shows an example of a voice information processing in the digital telephone set shown in FIG. 1; and FIG. 4B shows another example of the voice information processing in the digital telephone set shown in FIG. 1.

DETAILED DESCRIPTION OF THE PREFERRED EMBODIMENTS

Figure 1:
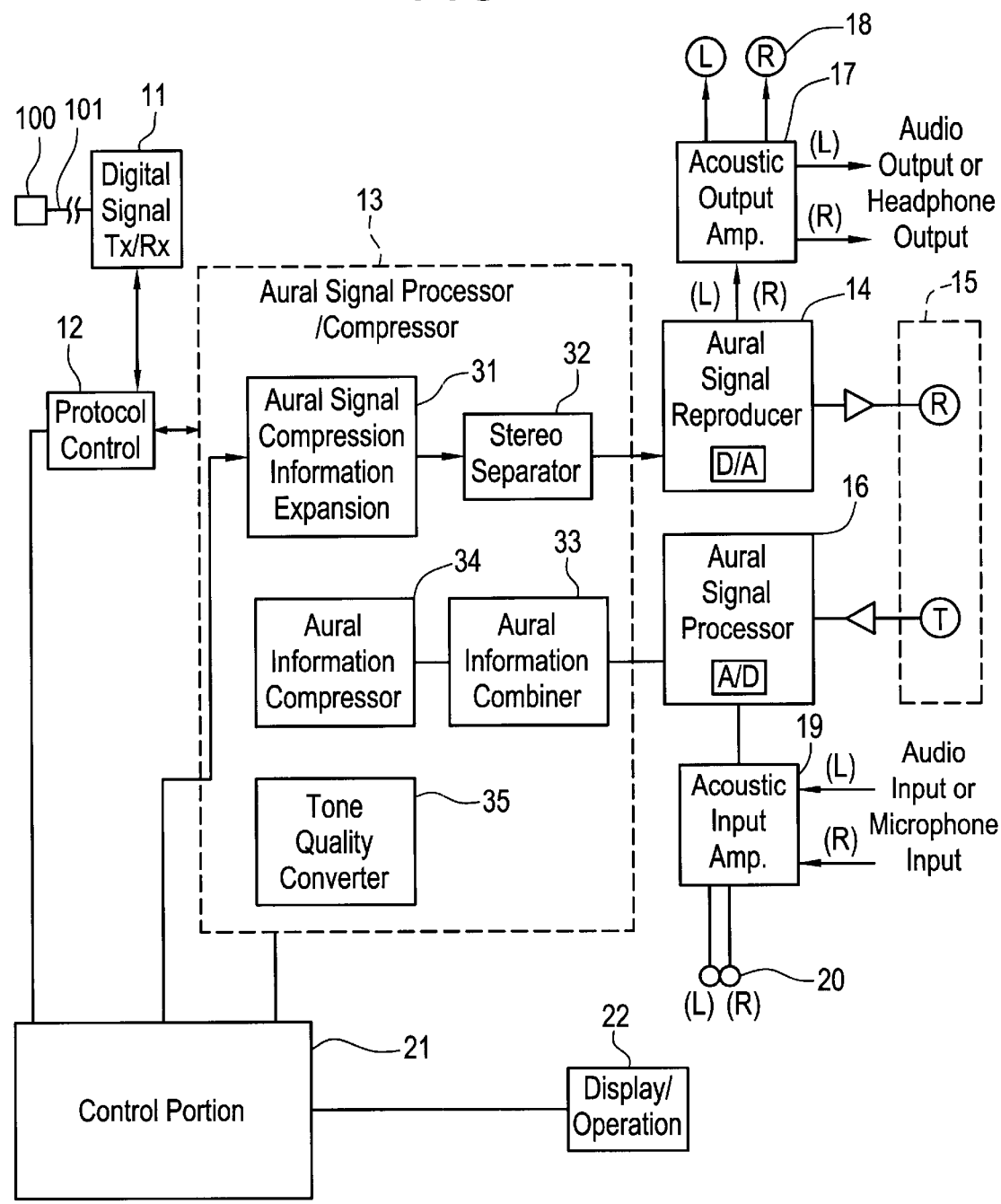
FIG. 1 is a block circuit diagram of a digital telephone set according to an embodiment of the present invention.

FIG. 1 is a block circuit diagram of a digital telephone set according to an embodiment of the present invention. In this embodiment, the present invention is applied to a high tone quality stereo digital telephone set which is connected to an integrated services digital network (ISDN) exchanger 100 through a digital signal transmission line which is a basic rate interface (BRI) circuit 101 of a communication provider. The high tone quality stereo digital telephone set includes a digital signal transmitter/receiver 11, a protocol control portion 12, an aural signal processor/compressor 13, an aural signal reproducing portion 14, a hand set 15, an aural signal processor 16, a sound output amplifier 17, a loud speaker 18 including a left (L) channel and a right (R) channel, a sound input amplifier 19 including a left (L) channel and a right (R) channel, a microphone 20, a control portion 21 and a display/operation portion 22.

Operations of the respective constitutional portions of the present telephone set will be described briefly.

The digital signal transmitter/receiver 11 transmits a digital signal from the protocol control portion 12 through the BRI circuit 101 to the ISDN exchanger 100 and receives a digital signal from the ISDN exchanger 100 through the BRI circuit 101.

The protocol control portion 12 converts a signal format of an aural signal information supplied from the aural signal processor/compressor 13 such that the signal format becomes compatible with that of a protocol of the BRI circuit 101 and adds a control information to the aural signal information.

The aural signal processor/compressor 13 has a function corresponding to an aural signal compression technique such as ADPCM (adaptive differential PCM) or waveform compression and performs an expansion of a compressed aural signal supplied from the protocol control portion 12, a separation of the expanded aural signal to stereo voice signals, a synthesizing of input stereo voice signals and a compression of the synthesized input stereo voice signals, a resultant signal being output to the protocol control portion 12.

The aural signal reproducing portion 14 converts the stereo voice signals output from the aural signal processor/compressor 13 into analog signals and outputs the analog signals to the hand set 15. On demand, the aural signal reproducing portion 14 amplifies the analog signals by the audio amplifier 17 and supplies them to the loud speaker 18, an audio equipment or a head phone.

The aural signal processor 16 converts an aural signal input from the hand set 15 or an aural signal supplied from the microphone 20 or an audio input equipment and amplified by the aural signal amplifier 19 into a digital signal and outputs the digital signal to the aural signal processor/compressor 13.

The control portion 21 controls a notification of a communication system information including the compression system: information and the stereo system information to the other side connecting device through the protocol control portion 12, the operation of the aural signal processor/compressor portion 13, a display on the display/operation portion 22 and the operation of the display/operation portion 22. The aural signal processor/compressor 13 includes an aural signal compression information expanding portion 31, a stereo separating portion 32, an aural signal information combining portion 33, an aural signal information compressing portion 34 and tone quality converter 35.

On the transmitter side, an aural signal information is compressed to a half or less such that a high tone quality aural signal can be transmitted at a transmission rate determined by the protocol of the BRI circuit 101. The high tone quality aural signal compression information expanding portion 31 expands the aural signal information compressed on the transmitter side. When the expanded aural signal information indicates the stereo system, the stereo separation portion 32 separates the aural signal information to the right and left signal information. The aural signal information combining portion 33 combines the digitized right and left aural signals to an aural signal information. The aural signal information compressing portion 34 compresses the combined aural signal information and, in order to realize the stereo communication, secures an information transmission capacity of the left voice information corresponding to that of the right voice information. This is also true in a case where a main aural signal information and a differential aural signal information are used by the communication system control. The tone quality conversion portion 35 performs, in order to change the amount of aural signal information, a conversion which corresponds to a change of sampling frequency or resolution in performing the A/D conversion. It is usual, in order to reduce the amount of signal information, to thin an aural signal information on a time axis or change a resolution of waveform information from high to low.

Figure 2:
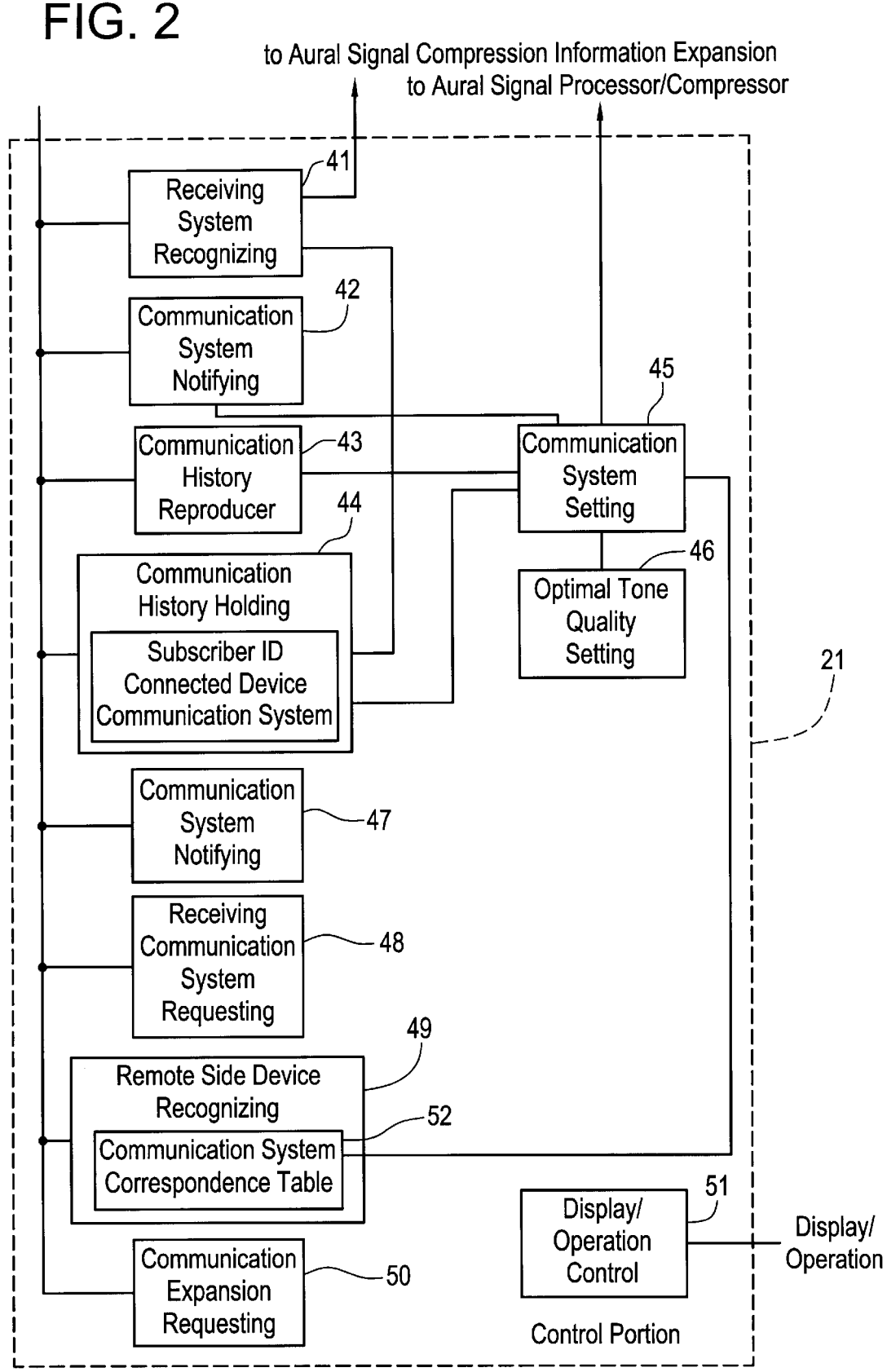
FIG. 2 is a block circuit diagram of the control portion shown in FIG. 1.

FIG. 2 is a block circuit diagram of the control portion 21 which is constructed with a digital signal processor (DSP) or a micro processor and comprises a receiving system recognizing portion 41, a communication system notifying portion 42, a communication history reproducing portion 43, a communication history holding portion 44, a communication system setting portion 45, an optimal tone quality setting portion 46, a communication system notifying portion 47, a receiving communication system requesting portion 48, a remote side device recognizing portion 49, a communication expansion requesting portion 50 and a display/operation control portion 51.

The receiving system recognizing portion 41 determines, on the basis of the control signal from the protocol control portion 12 related to a signal received by the digital signal transmitter/receiver portion 11, whether the receiving signal is a usual aural signal, a compressed high tone quality aural signal, a compressed stereo aural signal or an aural signal utilizing two B regions, etc. The receiving system recognizing portion 41 further determines the compression system.

The communication system notifying portion 42 notifies the communication system information including the compression system and the stereo system to the remote side connecting device through the protocol control portion 12. In response to this communication system information, the device connected to the remote side expands the aural signal information according to a system optimal to the receiving signal.

When a communication is established with a previously connected remote side through the same connecting device, the communication history reproducing portion 43 selects the communication system used in the previous communication according to the information stored in the communication history holding portion 44.

The communication history holding portion 44 can acquire an information of the other side according to the protocol of the BRI circuit 101 when the communication with the other side device is established and stores a subscriber's specific symbol (identifier: ID) of the other side, an information of the device connected to the other side and a communication system used in the communication, when the communication provider provides the ID and the information of the device connected to the other side.

The communication system setting portion 45 sets conditions necessary to perform a transmission according to the communication system, for example, the compression system and the stereo system, when the protocol control portion 12 receives a communication system assigning signal and the communication system is usable to transmit an aural signal by means of the digital telephone set.

When the communication system setting portion 45 sets the compression system and the stereo system as the communication system and preferentially sets a signal transmission/receiving rate compatible with a predetermined protocol of the digital signal transmission line 101, the optimal tone quality setting portion 46 determines the tone quality corresponding to compression rate of the aural signal information and the amount of aural signal information such that these parameters can be achieved with the signal transmission rate. Correspondingly to the tone quality set by the optimal tone quality setting portion 46, the tone quality changing portion 35 of the aural signal processor/compressor 13 changes the amount of aural signal information.

The communication system notifying portion 47 generates a communication system notification signal for instructing the other side connected thereto to change the communication system.

When the usable communication system is recognized by the remote side device recognizing portion 49 on the basis of the kind information of the device connected to the other side, the receiving communication system requesting portion 48 generates the communication system assigning signal for assigning the communication system for the transmission signal of the remote side device. The remote side device recognizing portion 49 has a communication system correspondence table 52 storing a correspondence between remote side devices and communication systems and, when the information of the remote side device is acquired by the protocol of the BRI circuit 101, selects one of the communication systems on which the remote side device can perform a receiving operation. In a case where the compression system and the stereo system are preliminarily set as the:communication system and the signal transmission rate on the BRI circuit 101 is switchably set, the communication expansion request portion 50 generates a signal requesting an increase of the signal amount to be used and outputs it to the exchanger 100 of the communication provider according to the protocol on the BRI circuit 101 when a compressed aural signal information exceeds a specific amount of information.

Now, a high tone quality stereo digital aural signal receiving operation of the embodiment shown in FIG. I will be described.

The transmission signal on the BRI circuit 101 is received by the digital signal receiving portion 11 and the digital signal receiving portion 11 converts the received signal format into a 2B+D signal format, that is, 64 kb/s+64 kb/s+16 kb/s digital signal. The kind of information, the remote side identification symbol or subscriber ID, the kind of the remote side device, other information related to the connection and various control signals are included in the D region (16 kb/s) of this digital signal.

Figure 3A:
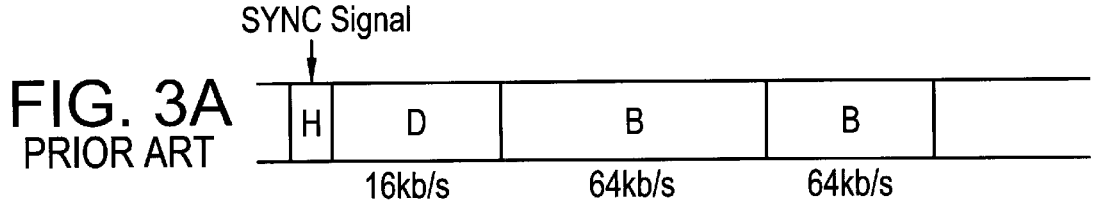
FIG. 3A shows a 2B+D signal format of ISDN.

The protocol control portion 12 determines the kind of information and, when it recognizes that the information contained in one B region of the digital signal is an aural signal information, sends data of the aural signal information to the aural signal compression information expanding portion 31. For the various control signals, the receiving system recognizing portion 41 of the control portion 21 determines whether the communication system included in the information from the protocol control porion 12 is a usual voice, compressed high quality voice, compressed stereo voice or a voice using two B regions, etc. The receiving system recognizing portion 41 further determines the method of compression.The construction of the aural signal information will be described with reference to FIGS. 3A to 3D and FIGS. 4A and 4B, by taking a case where an information compressed by the ADPCM system is acquired as an example, in which FIG. 3A shows a 2B+D signal format of ISDN, FIG. 3B shows an example of data format of a digital voice communication in the digital telephone set according to this embodiment, FIG. 3C shows another example of data format of a digital voice communication in the digital telephone set, FIG. 3D shows an example of data format of a usual digital aural communication, FIG. 4A shows an example of an aural signal information processing in the digital telephone set and FIG. 4B shows another example of the aural signal information processing in the digital telephone set.

Figure 3B:
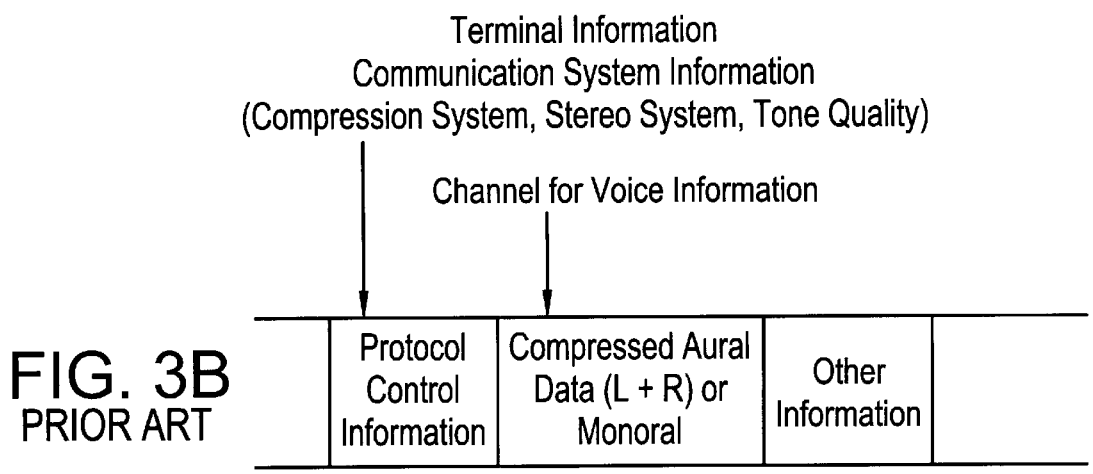
FIG. 3B shows an example of data format of a digital voice communication in the digital telephone set shown in FIG. 1.
Figure 3C:
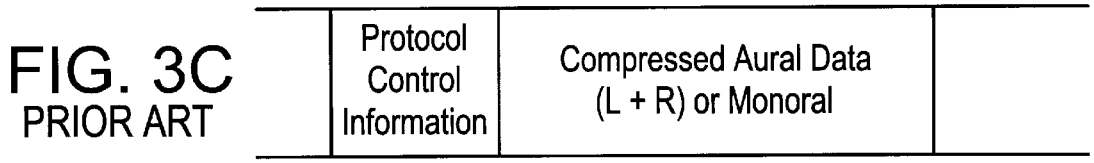
FIG. 3C shows another example of data format of a digital voice communication in the digital telephone set shown in FIG. 1.
Figure 3D:
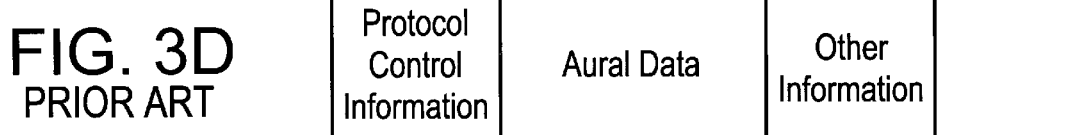
FIG. 3D shows an example of data format of a usual digital voice communication.

In this description, the term "usual voice" is one obtained by sampling a monaural analog aural signal shown in FIG. 4B at a sampling frequency of 8 kHz and converting the samples into a digital signal having a 8-bit resolution, has an information amount of 64 kb/s and is transmitted on the BRI circuit of the ISDN by utilizing one B region (64 kb/s) as shown in FIG. 3D.

In a case where the communication system information is a high tone quality aural signal compressed by ADPCM or a stereo aural signal, the aural signal is transmitted by using one B region as shown in FIG. 3B or two B regions as shown in FIG. 3C. When it is transmitted by using one B region, an information amount of aural signal corresponding to 128 kb/s can be transmitted by one B region since it can be compressed to one half by ADPCM. In this case, it is possible to realize a high tone quality communication capable of clearly reproducing up to high frequency voice by sampling the aural signal at a sampling frequency of 16 kHz. Further, since it is possible to compress the usual voice to ½ to thereby obtain the information amount of 32 kb/s, it is possible to perform a stereo communication in one B region by combining a right and left voice information such that they can be transmitted in one B region (64 kB/s) as shown in FIG. 4A. Similarly, in a communication utilizing two B regions, it is possible to perform a communication with an information amount of 256 kb/s, to perform a high tone. quality monaural aural communication of 16-bit resolution by sampling a monaural aural signal at a sampling. frequency of 16 kHz or perform high tone quality stereo communication of 8-bit resolution by sampling a left and right voices at a sampling frequency of 16 kHz, respectively. The sampling frequency and the resolution may be set suitably dependently upon the aural signal.

When such communication system information is recognized by the receiving system recognizing portion 41 and the receiving aural signal information is the compression format, the receiving aural signal information is expanded by the aural signal compression information expanding portion 31 correspondingly to the communication system and the compression rate. Alternatively, when the aural signal information has the stereo format having a right voice channel and a left voice channel, the stereo separation portion 32 separates the aural signal to a right signal portion and a left signal portion. Then, these aural signal portions are supplied to the aural signal reproducing portion 14 in which these signal portions are D/A converted correspondingly to the resolution as the sampling frequency of the aural signal information, resulting in analog aural signals. Although the aural signal reproducing portion 14 performs the 16-bit D/A conversion by fixing the uppermost frequency of the analog output drive frequency of the D/A converter to 16 kHz, the aural signals each of 8-bit resolution are reproduced by sampling the signal portions at a sampling frequency of 8 kHz by making up the information shortage by an interpolation performed by the signal processor. The high tone quality aural signal receiving can be realized by amplifying the aural signals in the form of electric analog signals corresponding to the right and left voices by the sound output amplifier 17 and converting them into sound signals by the right and left loud speakers 18. In this case, the hand set 15 or the stereo head phone may be used or an external audio device may be connected.

Now, an operation of this embodiment during a high tone quality stereo digital aural signal transmission will be described.

Voice is converted into electric analog signals by a micro phone 20 having stereo directivity corresponding to a right ear and a left ear. The electric analog signals are amplified by the audio input amplifier 19 and converted into digital signals by the aural signal processor 16. In this case, the A/D conversion of the signals is performed with 16 -bit resolution by sampling them at the sampling frequency of 16 kHz. When the communication system setting portion 45 sets the compression system and the stereo system as the communication system, the communication system setting portion 45 sends a control signal to the aural signal processor/ compressor 13 and, when the compression system is set, the aural signal information compressor 34 of the aural signal processor/compressor portion 13 compresses the aural signal information correspondingly to the compression system thus set. Further, when the stereo system is set, the aural signal information are combined by the aural signal information combiner 33 such that the right voice and the left voice are output as a transmitting aural information.

The setting of the communication system may be performed by determining a tone quality corresponding to a compression rate of the aural information and an amount of aural information by the optimal tone quality setting portion 46 such that, when the signal transmission rate compatible with the protocol is preferentially set, the compression rate and the amount of aural information are achieved with the signal transmission rate, or by increasing an amount of used signal by the protocol of the BRI circuit 101 when a compressed aural information exceeds a specific amount of information in a case where a preliminarily set communication system is preferential and the signal transmission rate compatible with the protocol of the BRI circuit 101 is set as to be switchable.

When the use of one B region of ISDN is preferential, the communication system which compresses 64 kb/s to ½ by ADPCM for the case of usual communication, 128 kb/s to ½ by ADPCM for monaural or 64 kB/s to ½ by ADPCM for each of stereo signals is selected. When the use of two B regions of ISDN is preferential, the communication system which compresses 256 kB/s to ½ by ADPCM for the monaural or compresses 128 kB/s to ½ by ADPCM for each of stereo signals is selected.

When the communication system is selected preferentially and the signal transmission rate is made switchable, one B region of ISDN is used if the communication system is set such that 128 kB/s is compressed to ½ by ADPCM for monaural and two B regions of ISDN are used if the communication system is set such that 256 kB/s is compressed to ½ by ADPCM for monaural. The signal transmission rate can be changed by addition or deletion of one B channel used and it is possible to match the digital telephone set with the remote side device by notifying the change of signal transmission rate from the communication expansion request portion 50 through the protocol control portion 12 to the communication provider's exchanger 100 and generating a communication system notifying signal by the communication system notifying portion 42 to instruct a change of communication system to the remote side device.Now, the aural signal information processing in the case where the ADPCM is utilized in this embodiment as the compression system will be described with reference to FIGS. 4A and 4B.

When the communication system is set to the usual voice by the optimal tone quality setting portion 46, etc., the amount of input aural information of 16-bit resolution obtained by sampling the input aural information at a sampling frequency of 16 kHz is converted into an amount of information corresponding to a tone quality of in the order of 8-bit resolution obtainable by sampling at 8 kHz by averaging the right and left aural signal information each being 64 kb/s and thinning a resultant average by means of the tone quality converter 35.

When the ADPCM is selected in the stereo system with each of right and left information being 64 kb/s, each of the right and left information amount of 64 kb/s is converted into an information amount corresponding to a tone quality of about 8-bit resolution by sampling the right and left information at a sampling frequency of 8 kHz, respectively, and compressing them to 32 kb/s by the ADPCM to thereby make the total amount of information 64 kB/s which can be transmitted by one B region, as shown in FIG. 4A. In this case, the right and left aural information can be represented by a monaural aural information and a difference between the right and left aural information, as shown in FIG. 4B. Alternatively, when the ADPCM is selected in the stereo system with each of the right and left aural information amount being 128 kB/s, the aural information amount of 128 kB/s is converted into an amount corresponding to 128 kB/s with high tone quality of about 8-bit resolution by sampling the right and left aural information at a sampling frequency of 16 kHz, respectively. The amount of the aural information thus converted are compressed to 64 kb/s by the ADPCM, respectively, and each of the compressed right and left aural information is transmitted in one B region so that the stereo aural information is transmitted in two B regions.

When the ADPCM is selected for a monaural aural signal having information amount of 256 kB/s, the monaural aural signal is sampled at a sampling frequency of 16 kHz to compress the information amount to 128 kB/s by the ADPCM to thereby make the monaural aural signal able to be transmitted in two B regions while the tone quality being kept at 16 bit resolution.

The communication system information including the aural information compression system and the stereo system is incorporated in the protocol control information by the communication system notifying portion 42 and the communication system information and the compressed aural information are transmitted through the transmission protocol control portion 12 and the digital signal transmitter/receiver 11.

In a case where the information of the remote side device can be acquired by the protocol of the BRI circuit 101, the remote side device recognizing portion 49 of the control portion 21 selects a communication system through which a receiving operation of the remote side device is possible, by reference to the communication system correspondence table 52 indicative of the correspondence between the communication systems and the devices connected to the network, when the communication is established with the remote side and the telephone set is connected to the remote side device.

When the communication between the telephone set and the remote side device is established and the information of the remote side can be acquired by the protocol of the BRI circuit 101, the control portion 21 instructs the communication history holding portion 44 to store the remote side subscriber identifier (ID) notified by the communication provider, the information of the remote side device connected to the network and the communication system used in the communication. When a communication is established between the digital telephone set and the same remote side device thereafter, the communication history reproducing portion 43 compares the information in the communication history holding portion 44 with an information obtained during the connection, selects the communication system used in the previous communication and sets the same communication system in the communication system setting portion 45.

When a usable communication system is recognized from the kind information of the remote side device by referencing to the communication system correspondence table 52, the receiving communication system requesting portion 48 generates the communication system assigning signal for assigning the communication system to be used by the remote side device to transmit an aural information. This communication system assigning signal is sent to the remote side device through the protocol control portion 12. In response to this signal, the communication system of the remote side device is changed to the assigned system and transmits the aural information.

In this embodiment, when the digital telephone set receives the communication system assigning signal from the remote side device, the control portion 12 of the digital telephone set judges whether or not it is possible to transmit signal according to the communication system assigned by the remote side device. If it is possible, the digital telephone set changes the compression system and the stereo system and sets the changed compression system and the stereo system in the communication system setting portion 45 in order to transmit signal according to the assigned communication system in a case where howling occurs due to acoustic coupling between the output voice of the loud speaker 18 and the microphone 12, it may be possible to use a head phone instead of the loud speaker or utilize a loud speaker communication function of the voice switch system or the echo cancelling system.

As will be clear from the foregoing description, the following advantages can be obtained according to the present invention.

The first advantage of the present invention is that it is possible to achieve a high tone quality aural communication with using the digital telephone set. That is, although the information amount of usual voice is 64 kb/s in one B channel of the ISDN, the information amount is usually compressed to ½ by using the ADPCM in the present invention. Therefore, it is possible according to the present invention to perform an aural communication with the information amount of 128 kb/s. While usual voice having information amount of 64 kb/s has a 8-bit resolution at a sampling frequency of 8 kHz, the sampling frequency of voice having information amount of 128 kb/s is 16 kHz and voice can be transmitted up to high frequency voice.

The second advantage of the present invention is that it is possible to achieve high tone quality stereo communication by means of the digital telephone set. That is, the information amount is usually compressed to ½ by using the ADPCM in the present invention though the information amount of usual voice is 64 kb/s in one B channel of the ISDN as mentioned above. Therefore, it is possible to transmit each of stereo voices with the information amount of 32 kb/s. Thus, since the information amounts of the right and left are compressed to 32 kb/s, respectively, it is possible to achieve a stereo communication with using only one B channel of the ISDN, while maintaining the tone quality of the right and left voices with the information amount of each voice being 64 kb/s.

The third advantage of the present invention is that a higher quality voice communication can be achieved by using a digital telephone set. That is, although the information amount of usual voice is 64 kb/s in one B channel of the ISDN, a voice communication with the information amount, of 128 kb/s is possible according to the present invention since the information amount can be usually compressed to ½ by using, for example, ADPCM as the compression method as mentioned above. Therefore, it is possible to perform an aural communication with the information amount of 128 kb/s. Further, it is possible to perform an aural communication with the information amount of 256 kb/s by changing the number of B channels to be used to two under control of the communication protocol. Since, although the resolution and the sampling frequency of an aural signal having information amount of 64 kb/s are 8 bits and 8 kHz, respectively, the resolution and the sampling frequency of an aural signal having information amount of 256 kb/s can be set to 16 bits and 16 kHz, respectively. Therefore, it is possible to transmit a high frequency aural signal clearly.

The fourth advantage of the present invention is that a higher quality stereo voice communication can be achieved by using a digital telephone set. That is, although the information amount of usual voice is 64 kb/s in one B channel of the ISDN, the information amount can be usually compressed to ½ by using, for example, ADPCM as the compression method, as mentioned above. Therefore, a voice communication with the information amount of each of the right and left voices being 128 kb/s is possible according to the present invention. Since the information amounts of the right and left voices are compressed to 64 kb/s, respectively, by changing the communication channel to two B channels under control of the communication protocol, it is possible to achieve a stereo communication with higher tone quality with the information amount of each of the right and left voice information being 128 kb/s, respectively, by using two B channels of the ISDN.

The fifth advantage of the present invention is that the selection of communication system in aural communication through a digital telephone set is facilitated and the operability is improved. That is, since the present invention is equipped with the communication history reproducing portion, the remote side device recognizing portion, the optimal tone quality setting portion and the receiving communication system requesting portion, etc., the communication system can be set by users having no knowledge of setting the communication system.

What is claimed is:

1. A digital telephone set comprising;
   a digital signal transmitter/receiver for receiving a digital signal with respect to a digital telephone circuit;
   a protocol control portion for transmitting receiving various control signals through said digital signal transmitter/receiver and said digital telephone circuit and converting an information contained in the digital signal into a series of information by determining the kind of information in the directivity of the digital signal correspondingly to a protocol of the digital signal;
   a receiving system recognizing portion for recognizing a communication system which sends the digital signal when said protocol control portion performs said converting and said digital signal includes aural information;
   a receiving aural signal processing means for processing the aural information according to the communication system recognized by said receiving system recognizing portion; and
   acoustic output means for converting the aural information processed by said receiving aural signal processing means into an analog aural information and supplying the analog aural information as an acoustic signal, wherein
   said receiving aural signal processing means includes a compressed aural information expanding portion for expanding the aural information correspondingly to a compression system and a compression rate according to said recognized communication system obtained by said receiving system recognizing portion that the aural information is compressed and a stereo separation portion for separating the aural information to a right and left aural information, and
   said acoustic output means includes means for outputting a stereo aural information according to said right and left aural information.

2. A digital telephone set as claimed in claim 1, further comprising:
   acoustic input means for converting a sound into a digital aural information having directivity corresponding to a right channel and a left channel;
   a communication system setting portion for preliminarily setting the communication system for transmitting the aural information input from said acoustic input means to said digital telephone circuit to a compression system and a stereo system;
   transmitting aural signal processing means for processing the digital aural information from said acoustic input means according to the compression system and the stereo system; and
   a communication system notifying portion for incorporating the communication system information indicative of a compression rate and a stereo feature of the digital aural information output from said transmitting aural signal processing means in the protocol control information, wherein said protocol control portion transmits the protocol information in which the communication system information is incorporated by said communication system notifying portion to a remote side through said digital signal transmitter/receiver and said digital telephone circuit and transmits the digital aural information output from said transmitting aural signal processing means after a format of the digital aural information is converted into a format compatible with the protocol of said digital telephone circuit.

3. A digital telephone set as claimed in claim 2, further comprising:

an optimal tone quality setting portion for determining a tone quality corresponding to a compression rate of the aural information and an amount of the aural information such that the digital aural information becomes within a signal transmission rate, when the compression system and the stereo system are preliminarily set as the communication system and the signal transmission rate compatible with the protocol of said digital telephone circuit is preferentially set; and a tone quality converter for converting the amount of the digital aural information according to the tone quality set by said optimal tone quality setting portion.

4. A digital telephone set as claimed in claim 2, further comprising:

a communication expansion request portion for requesting an exchanger of a communication provider an increase of an amount of signal to be used through said protocol control portion when a compressed aural information exceeds a specific amount of information in a case where the compression system and the stereo system are preliminarily set as the communication system and the signal transmission rate compatible with the protocol of said digital telephone circuit is set as switchable; and a communication system notifying portion for transmitting a communication system notifying signal for instructing a change of the communication system to the remote side device through said protocol control portion.

5. A digital telephone set as claimed in claim 2, further comprising a remote side device recognizing portion for recording, in a case where, when said digital telephone set is connected to remote side devices, an information of said remote side devices can be acquired by the protocol of said digital telephone circuit, a correspondence between the acquired information and the communication systems thereof as a communication system correspondence table and for selecting, when said digital telephone set is connected to the same remote side device thereafter, the communication system with which the remote side device can receive it.

6. A digital telephone set as claimed in claim 2, further comprising:

a communication history holding portion for storing, in a case where, when said digital telephone set is connected to remote side devices, an information of said remote side devices can be acquired by the protocol of said digital telephone circuit and a communication provider provides a remote side subscriber specific identifier and an information of a remote side device connected to said digital telephone set, the remote side subscriber identifier, the information of the remote side device connected to said digital telephone set and a communication system used in this communication; and a communication history reproducing portion for comparing, when a communication between said digital telephone set and the same remote side through the same connecting device is established thereafter, the information of said communication history holding portion with an information at a time of the connection and selecting the communication system of the previous communication.

7. A digital telephone set as claimed in claim 2, further comprising a receiving communication system request portion for recognizing communication systems which can be utilized by devices connected to the remote side from an information of said devices, selecting one of the communication systems as a communication system for use in performing a transmission of one of said devices and assigning the selected communication system to said device of the remote side through said protocol control portion and said digital circuit, wherein said communication system setting portion sets said transmitting aural signal processing means such that the latter performs a transmission by using the communication system when said digital telephone set can perform a transmission by using the communication system assigned by said device of the remote side.

8. A digital telephone set comprising:

acoustic input means for converting an aural information into digital aural information with directivity corresponding to respective right and left channels;

a communication system set up portion for preliminarily setting up a compression system and a stereo system as the communication system for transmitting the aural in formation output from said acoustic input means to a digital telephone circuit;

a transmitting aural signal processor for processing the digital aural information from said acoustic input means correspondingly to the compression system and the stereo system;

a communication system notifying portion for incorporating a communication system information indicative of a compression rate and a stereo feature of the digital aural information output from said transmitting aural signal processor in a protocol control information;

a protocol control portion for converting the digital aural information processed by said transmitting aural signal processor such that the digital aural information becomes compatible with a protocol of said digital telephone circuit and for transmitting/receiving various control information including the protocol control information; and a digital signal transmitter/receiver for transmitting the digital aural informa converted by said protocol control portion to said digital telephone circuit and transmitting/receiving various control information between said protocol control portion and said digital telephone circuit.

* * * * *